United States Patent [19]
Montalbano

[11] Patent Number: 5,838,775
[45] Date of Patent: Nov. 17, 1998

[54] SYSTEM AND METHOD FOR PROVIDING A USER-SELECTABLE INTERFACE FOR A SCREEN TELEPHONE

[75] Inventor: John Richard Montalbano, Carmel, Ind.

[73] Assignee: AT&T Corp, Middletown, N.J.

[21] Appl. No.: 764,800

[22] Filed: Dec. 12, 1996

[51] Int. Cl.[6] .................................................. H04M 11/00
[52] U.S. Cl. .................................... 379/93.23; 379/93.17; 379/368; 341/23; 345/172
[58] Field of Search .............................. 379/90.01, 93.01, 379/93.05–93.08, 93.12, 93.13, 93.17–93.19, 93.23–93.29, 93.31, 93.32, 93.37, 110.01, 368, 433, 434, 428; 341/22, 23; 345/172, 173

[56] References Cited

U.S. PATENT DOCUMENTS 5,457,738  10/1995  Sylvan ................................... 379/93.23
5,657,378   8/1997  Haddock et al. ...................... 379/93.23

OTHER PUBLICATIONS

Ed Margulies; Understanding the Voice–Enabled Internet; 1996; pp. 11–26 to 11–27; 11–45 to 11–47.

Primary Examiner—Wing F. Chan

[57] ABSTRACT

A system and method for providing an interactive interface having selectable graphical elements that represent the numbers of a telephone keypad. The interface is selected by the user for a screen telephone. A user sends an interface request to an interface platform using a multimedia user interface on the user's screen phone. The interface platform retrieves interface data from a connected interface database and sends the requested interface to the screen phone. The screen phone stores the interface data on a connected screen phone database, and presents the interface to the user. The interface comprises at least one from the group of textual, graphic, animation, audio and video media. Visual elements of the interface are selected by the user when the user touches the visual element on the screen of the screen phone. The selectable features incorporate telecommunications, interface selection and editing, and information request features.

28 Claims, 5 Drawing Sheets

SYSTEM AND METHOD FOR PROVIDING A USER-SELECTABLE INTERFACE FOR A SCREEN TELEPHONE

FIELD OF INVENTION

The present invention relates to multimedia interfaces for communication devices. More specifically, the present invention relates to providing a user-selectable, multimedia interactive interface for a touch screen telephone.

BACKGROUND

Traditional telephones can be constructed to represent a theme. For example, traditional mechanical theme telephones are available in the shape of familiar characters such as popular entertainment icons or objects such as race cars, pianos, and frogs.

Telephone interfaces have also been implemented on touch screen devices. A telephone with a touch screen (a "screen telephone") has touch screens having selectable graphical objects that correspond to the push buttons of traditional telephones. Screen telephones can also display enhanced telephone service features such as caller I.D. and automatic redial. The interfaces of known screen telephones are constructed along strictly functional lines and are not easily selected or configured by the telephone's user.

Nor are traditional telephone interfaces (e.g., the touchpad) selectable or easily configured by the user. Rather, the touchpad is essentially fixed once it is manufactured, and the user must avail herself of special services by pressing a combination of mechanical buttons on the interface. For example, a user desiring to automatically call back the most recent caller who received a busy signal may have to push a multiple-key sequence such as the star key followed by the six key and the five key. This is complex, difficult to remember, and inconvenient.

Internet-related interfaces such as those provided on the World Wide Web (WWW) also suffer from several shortcomings. A website has several interfaces from which the user may select, but each such interface is generally fixed and cannot be tailored by the user to meet her specific requirements. Further, the user must move from host to host over different connections to take advantage of the full range of interfaces across websites. Certain interfaces may be unavailable due to bad connections and slow or down hosts. Although some known WWW interfaces provide telephonic features, none presently offer a full range of user selectable options whereby a user can fully tailor an interface to accurately reflect the specific services to which she subscribes or to a particular theme in accordance with which the user wishes the interface to appear.

Ideally, a telephone would provide the user with the ability to select and configure an interface in accordance with specific services to which the user subscribes. The interface would be easy to edit or change in accordance with the changing set of user services. Further, the interface would be able to be constructed around a theme that would render it easy and intuitive to use. The theme would be easy to change in accordance with the preferences of the user. Moreover, the ideal telephone would store interfaces in a single location and a uniform format thereby ensuring reliability and improving the user's ability to understand the interfaces. Finally, the interfaces would incorporate telephonic features for convenience, including selectable graphical elements that represent the numbers on a telephone keypad.

SUMMARY OF THE INVENTION

The present invention provides a user-selectable interactive interface having selectable graphical elements that represent numbers on a telephone keypad for a screen telephone that is connected to a network such as the public switched telephone network (PSTN) or a data network such as the Internet.

In accordance with the present invention, a networked interface platform receives a request for an interface from the screen phone. The interface platform is connected to an adjunct platform that stores multimedia interactive interfaces. Multimedia interface features include at least one from the group of textual, graphic, animation, audio and video media. When the interface platform receives an interface request, it retrieves the appropriate interface from the interface adjunct platform and sends it to the requesting screen phone for display to the user.

The present invention also includes a database connected to the screen phone. The screen phone database stores the interfaces sent from the interface platform to the screen phone.

In accordance with the present invention, the interface has selectable graphical elements that represent numbers on a telephone keypad. In further accordance with the present invention, the interface has service features that, when selected by the user, provide services such as autodialing, a personal calendar, a message waiting indicator, a phone book, a list of emergency telephone numbers, a caller identification indicator, keypad and a call waiting indicator. The service features of an interface are requested by the user, or determined by the interface platform using customer profile data that is indexed by the network address of each user.

The screen phone also presents an interface having an advertisement. Advertisements are selected by the user, or else determined by the user's customer profile and the user's network address. An interface request is generally created or designated by the user, but may also be made or designated by third parties. For example, in one embodiment of the present invention, a third party requests a birthday card interface be presented to the user on the user's birthday. The interface platform sends the birthday interface to the user.

DETAILED DESCRIPTION

Figure 1:
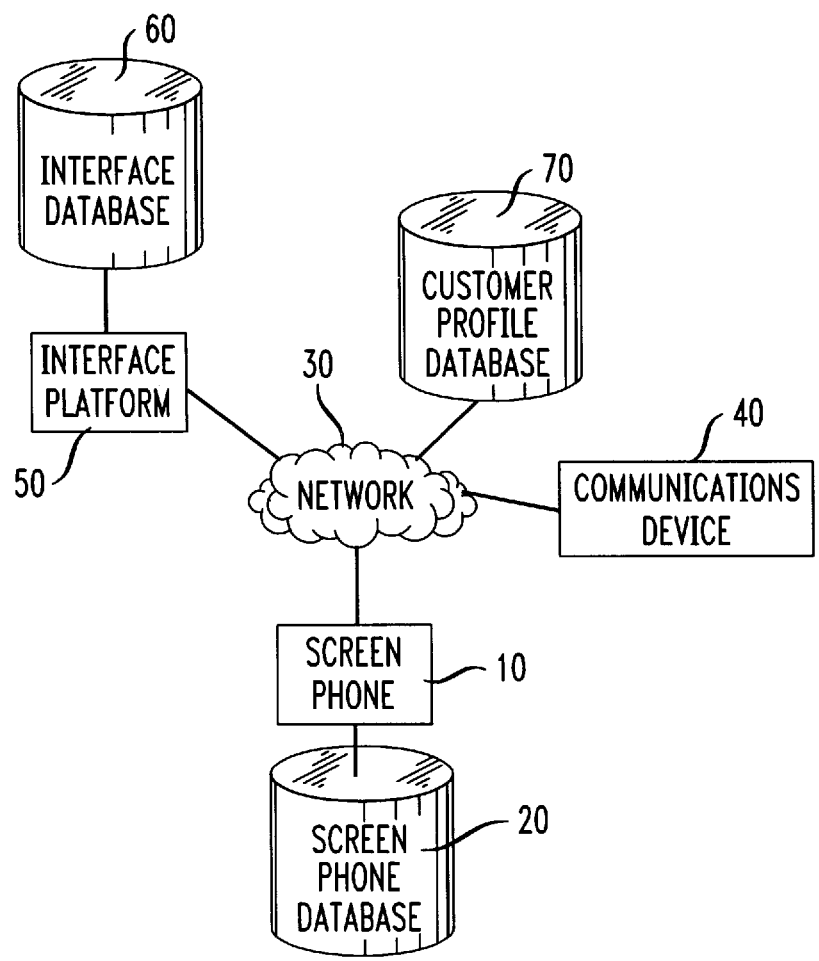
FIG. 1 illustrates a communication system according to an embodiment of the present invention.

FIG. 1 shows a communication network according to an embodiment of the present invention. Screen phone 10 is connected to screen phone database 20. Screen phone 10 is also connected to a network 30 in well known fashion. In one embodiment, network 30 is the public switched telephone network (PSTN). In another embodiment, network 30 is a data network. An example of such a data network is the Internet.

Network 30 is connected to communication device 40, which in one embodiment is another screen telephone; in another embodiment, it is a traditional telephone; in yet another embodiment, it is a personal computer enabled to originate and receive telephone calls. Although FIG. 1 shows only a single screen phone 10 and a single communication device 40, any number of screen phones and communication devices can be connected to the network 30.

In accordance with the present invention, screen phone 10 has a color display screen which represents traditional mechanical telephone buttons as graphical objects. The screen of screen phone 10 is touch sensitive so that when the user presses the area of the screen corresponding to a graphical object, the function represented by the graphical object is carried out.

In accordance with the present invention, the interactive interface of the screen phone 10 can be tailored by the user to correspond to the services to which she has subscribed, and to suit her own tastes. The interface is multimedia, with features comprising at least one element from the group of text, graphics, audio, video and animation media.

Figure 2:
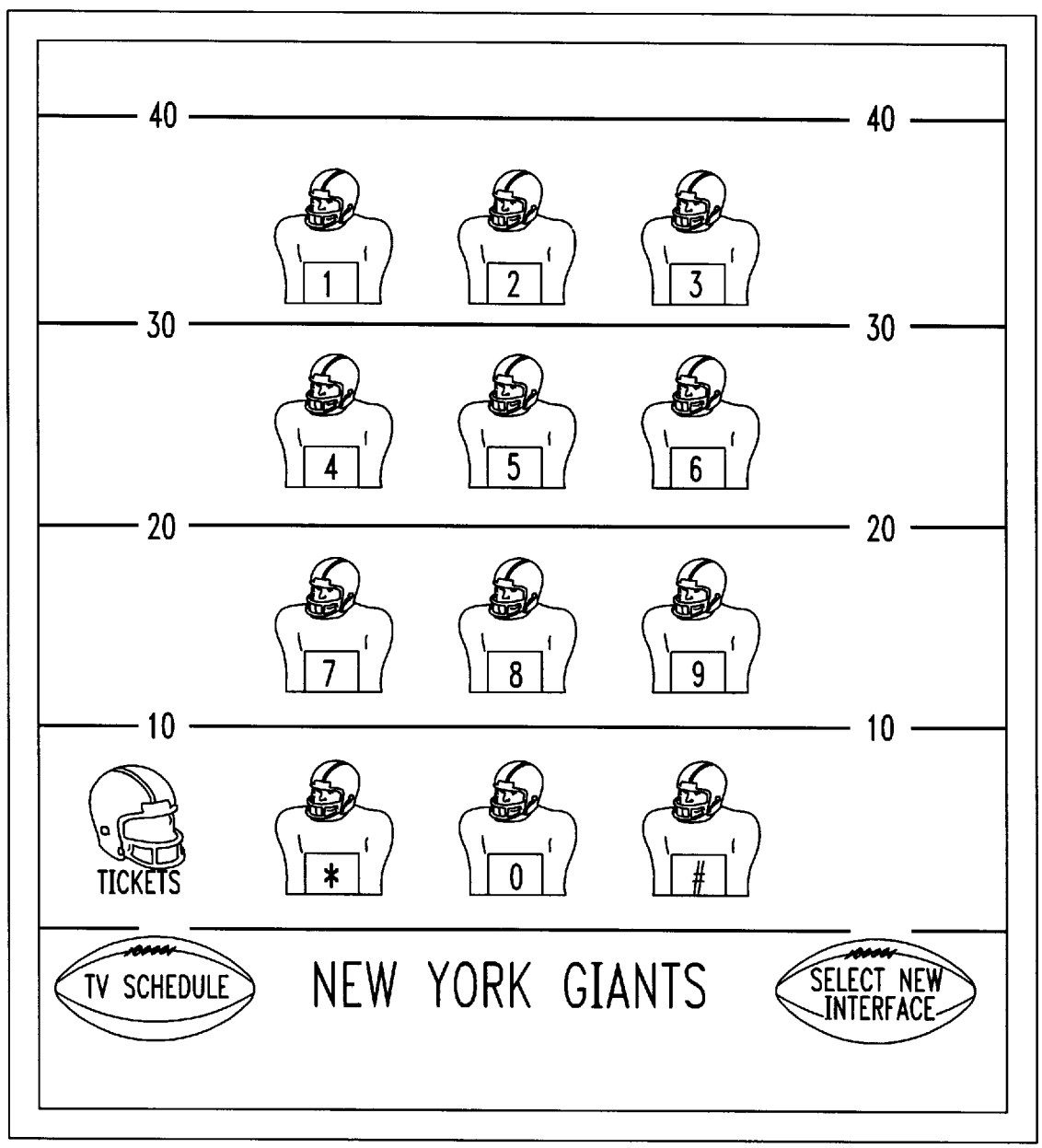
FIG. 2 shows a graphic screen according to an embodiment of the present invention.

In accordance with the present invention, these multimedia features are configured around a theme selected by the user. In one embodiment, the theme is football; in another embodiment, the theme centers around a popular television show; in yet another embodiment, the theme is Christmas. For example, the touch tone buttons of screen phone 10 in one embodiment are represented by the torsos of football players, as shown in FIG. 2. The number on each football player's jersey represents the number dialed on the screen phone 10 when that player is selected by the user.

In another embodiment, the theme in accordance with the present invention for screen phone 10 is a bubbling cheese pizza, 12. In accordance with the present invention, numbered pepperonis serve as touch tone buttons. Another pepperoni is labeled "Order" and speed dials the number of a local pizzeria when selected. In another embodiment, when the Order pepperoni graphic is selected, the user is presented with another screen with touch sensitive graphics designed to build a detailed order for a pizza. When the user is finished selecting the size and toppings for her pizza, the user selects the send graphic, and the order is automatically forwarded to a local pizzeria. The forwarded order also comprises source data by which the pizzeria knows where to deliver the pizza. Method of payment information in one embodiment is programmed into the screen telephone (e.g., the user enters her credit card number through a screen phone interface and the number is stored) and is forwarded to the vendor. In another embodiment, no payment information is sent to the vendor, and the product is paid for by the user on delivery.

The theme of the screen phone 10 comprises at least one of the group of textual, audio, graphic and animation media. In one embodiment of the football interface shown in FIG. 2, a busy signal is delivered by an graphic animated referee who marches onto the screen and audibly declares "interception!—line busy."

The interface can also incorporate other functions of screen phone 10 at the option of the user, including preset dial buttons, a personal calendar, message waiting, caller I.D., caller waiting, and keypad. For example, by selecting the "TV Schedule" button shown in FIG. 2, the screen can display a schedule of televised football games; by selecting the "Tickets" button shown in FIG. 2, the user can order football game tickets. In one embodiment, advertisements are incorporated into the multimedia interface.

In one embodiment, the user selects an interface package from a predetermined set of interface themes. Network 30 (FIG. 1) is also connected to interface platform 50 which is, in turn, connected to interface database 60. Interface database 60 contains the predetermined interfaces from which a requesting party, e.g., the calling party, can select a desired theme and the desired interface consistent with that theme. Once an interface has been selected, it is downloaded and stored on screen phone database 20. In one embodiment, database 20 is connected directly to screen phone 10. In another embodiment, database 20 is connected to screen phone 10 through network 30. In yet another embodiment, database 20 is connected to screen phone 10 through a local area network. In another embodiment, a multimedia interface is stored at the interface database 60 and downloaded to screen phone 10 when necessary.

Interface platform 50 controls the selection and modification of the interfaces stored on interface database 60. The selection of the interfaces can be performed according to the interface request of the requesting party or can be performed automatically based on, for example, a customer profile that is stored on interface database 60 or a customer profile database 70 connected to the network 30. When the requesting party wants to select or modify an interface, the requesting party interacts with interface platform 50 through communication network 30.

Figure 3:
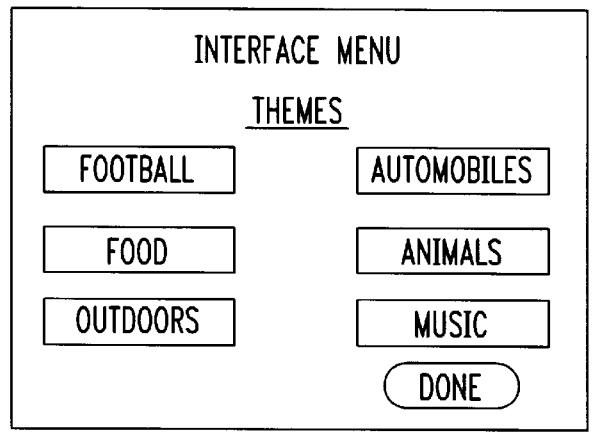
FIG. 3 shows a graphic screen to select an interface menu theme according to an embodiment of the present invention.
Figure 4:
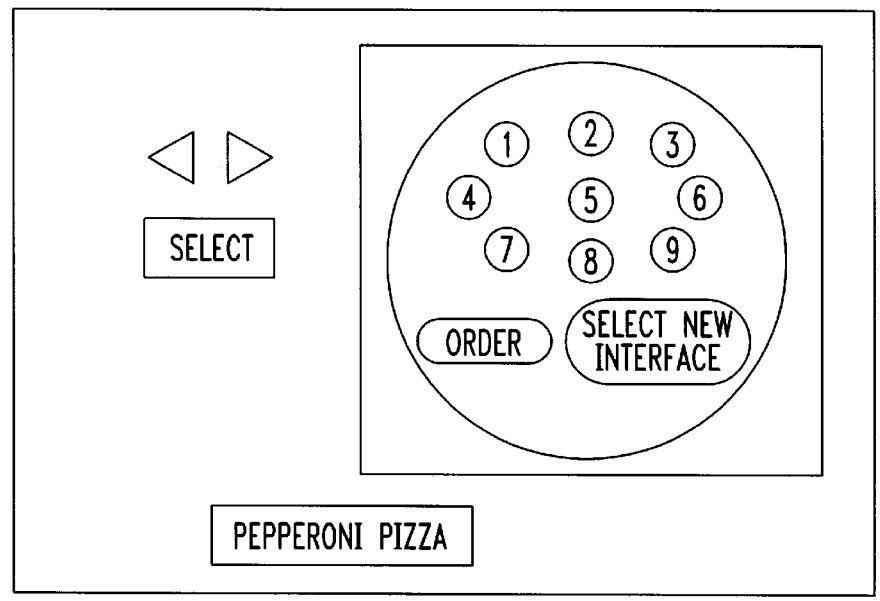
FIG. 4 shows a graphic screen to select an interface according to an embodiment of the present invention.
Figure 5:
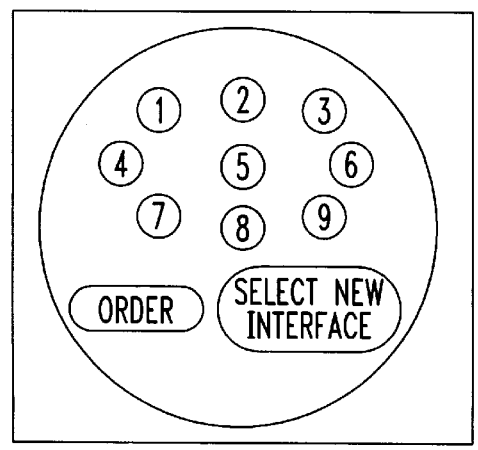
FIG. 5 shows a graphic screen of a newly selected interface according to an embodiment of the present invention.

As shown in FIG. 2, the requesting party in this embodiment changes the interface by selecting the "Select New Interface" button. A screen is shown to the user outlining selectable interface packages in accordance with certain themes, an example of which is shown in FIG. 3. The user selects an interface package button, which becomes highlighted. If the user is pleased with her choice, she selects the "Done" button. For example, the user may select the "Food" interface package selection. The user then browses through a series of screens showing different interface packages related to food, using the arrow buttons shown in FIG. 4. The forward button shows the next screen, whereas the backward button shows the previous screen. The interface package title is displayed at the bottom of the graphic screen. For example, FIG. 4 illustrates an interface related to the food theme, specifically, an interface entitled, "Pepperoni Pizza."

Another feature of the present invention allows several interfaces to be shown to the user over time. In one embodiment, the user selects the interface category "Football," and the user's interface is changed to one built around a different football team each time the user takes the telephone off hook. In another embodiment, a new interface is displayed for a set period of time and then changed to another interface.

In one embodiment of the present invention, interface platform 50 selects interface screens to display to the user based upon the user's customer profile. Customer profile is information in a database about the customer. The customer profile can include such information as the customer's name, account name, credit card number, credit card expiration date, and service usage history. The selected screens are interleaved with user-selected screens, or displayed to the user exclusively, particularly when the user has failed to select any interface herself.

The customer profile can also be utilized to select advertisements to display to the user based on the selected theme. For example, where a pizza interface for the food theme has been selected, an advertisement for particular pizza brand can be presented as part of the interface. Advertisements can be submitted by advertisers who subscribe to a service making the advertisements available to users of the present invention.

Figure 6:
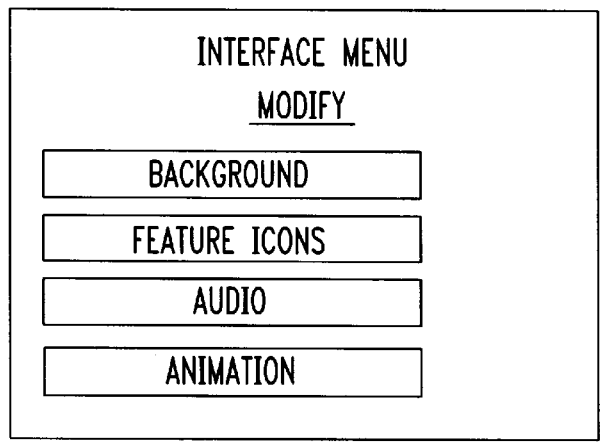
FIG. 6 shows a graphic screen to modify an interface according to an embodiment of the present invention.
Figure 7:
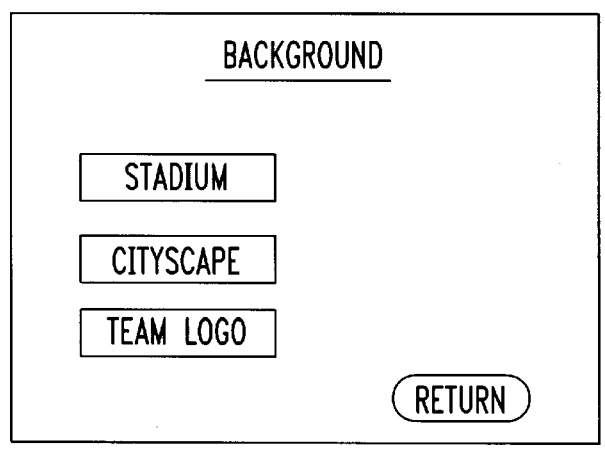
FIG. 7 shows a graphic screen to modify the background of an interface according to an embodiment of the present invention.
Figure 8:
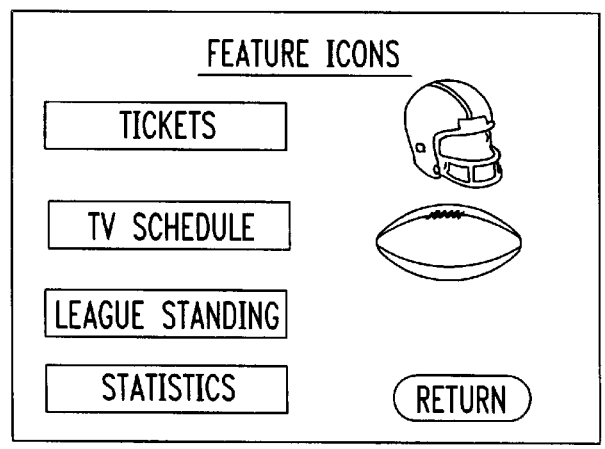
FIG. 8 shows a graphic screen to modify the feature icons of an interface according to an embodiment of the present invention.

Another feature of the present invention allows the user to customize specific aspects of an interface, such as the display background, feature icons, and audio content. FIG. 6 illustrates a graphic screen which allows the user to select the aspect of the interface that is to be modified. As FIG. 6 shows, the user can modify the background, the feature icons, the audio content, or the animation content. Once the user selects a specific aspect for modification, a new graphic screen as such FIG. 7 allows the user to select a substitute feature. For example, FIG. 7 illustrates a list of possible alternatives for a background consistent with the football theme illustrated in FIG. 2. Once the user selects a substitute background, such as a stadium, the user can select the "Return" button to return to the normal display screen such as FIG. 2. Similarly, FIG. 8 illustrates possible alternatives for feature icons consistent with the football theme illustrated in FIG. 2. For example, the user can select a particular feature such as ordering tickets, viewing the television schedule, viewing the league standings and/or viewing team statistics. The user can also select a theme-based icon associated with a particular feature. For example, once the viewer has selected the feature of viewing the team statistics, the viewer can also specify that this feature be represented by a football helmet icon.

An interface request can be made by the calling party or by a party other than the calling party. A requesting party can transmit a interface request to interface platform 50. Interface platform 50 then retrieves an interface from interface database 60 based on the interface request. For example, a requesting party can send a birthday greeting to the user at the screen phone 10. In such a case, when the user uses screen phone 10, the user will be presented with an interface selected by the requesting party that is based on a birthday theme.

Figure 9:
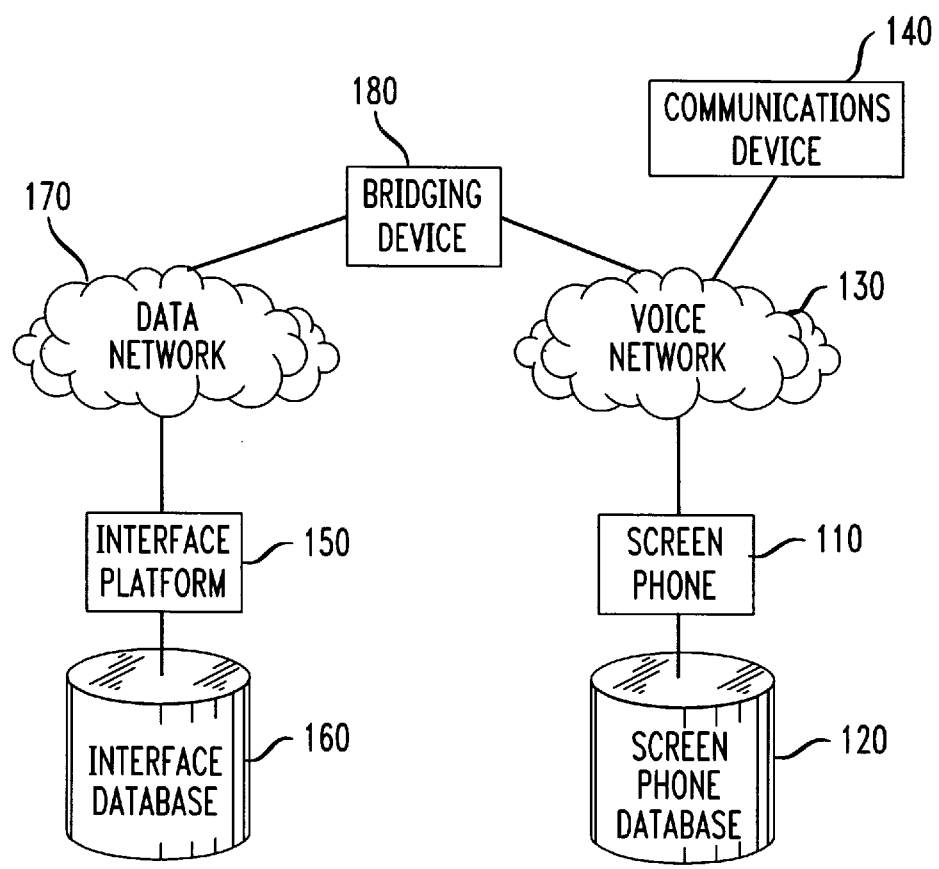
FIG. 9 illustrates another embodiment of the present invention having multiple networks.

In another embodiment of the present invention, the components of the present invention can be distributed across multiple networks where the multiple networks are connected by a network bridging device or gateway. FIG. 9 illustrates another embodiment of the present invention having multiple networks. Screen phone 110 is connected to screen phone database 120 and to voice network 130 in well known fashion; voice network 130, for example, can be the PSTN. Voice network 130 is connected to communication device 140 which can be of any of a variety of types, such as a telephone or telephonically enabled personal computer. Voice network 130 is connected to data network 170 through bridging device 180. Interface platform 150 is connected to data network 170. Interface database 160 is connected to interface platform 150.

It should, of course, be understood that while the present invention has been described in reference to particular system configurations, other configurations should be apparent to those of ordinary skill in the art. For example, the present invention can operate on any type of network or combinations of networks, such as a voice network like PSTN, a data network like the Internet, a packet-switched communication network, and/or an ATM-based network.

What is claimed is:

1. A method for providing an interactive screen phone interface that is selectable by a user, comprising:

(a) receiving an interface request for the interactive screen phone interface, said interface comprising selectable graphic elements that represent numbers on a telephone keypad; and (b) sending the requested interface to the screen phone for presentation to the user.

2. The method of claim 1, further comprising the step of:

(c) presenting the interface on the screen phone to the user.

3. The method of claim 2, wherein the interface has a service feature.

4. The method of claim 3, wherein the service feature is based upon the network address of the user.

5. The method of claim 3, wherein the service feature includes at least one from the group of an autodialing feature, a personal calendar, a message waiting indicator, a caller identification indicator, a phone book, emergency numbers, a keypad and a call waiting indicator.

6. The method of claim 3, wherein the interface includes an advertisement.

7. The method of claim 6, wherein the advertisement is based upon the network address of the user.

8. The method of claim 6, wherein the advertisement is based on a customer profile.

9. The method of claim 2, wherein the selected interfaces are presented in a round-robin fashion.

10. The method of claim 1, further comprising the step of:

(d) downloading the interface from an interface database to a screen phone database connected to the screen phone.

11. The method of claim 1, wherein the interface request is received from the user.

12. The method of claim 1, wherein the interface request is received from a party other than the user.

13. The method of claim 1, wherein the interface includes at least one from the group of textual, graphic, audio and video media.

14. The method of claim 1, further comprising the step of:

(d) activating telephonic functions when an interactive screen of the screen phone is touched.

15. A system for displaying an interactive interface from a plurality of interfaces on a screen phone connected to a network, each interface having selectable graphic elements that represent numbers on a telephone keypad selectable by a user, comprising:

(a) an interface database storing the plurality of interactive interfaces selectable by the user; and (b) an interface platform connected to said interface database and to the screen phone, said interface platform receiving an interface request and sending the interactive interface from the plurality of interactive interfaces to the screen phone.

16. The system of claim 15, further comprising:

(c) a screen phone database connected to the screen phone, said screen phone database storing the interface downloaded from said interface database.

17. The system of claim 15, wherein the screen phone presents the interface.

18. The system of claim 17, wherein the screen phone presents the interface having a service feature.

19. The system of claim 18, wherein the service feature is determined from a network address of the user.

20. The system of claim 18, wherein the screen phone presents the interface having an advertisement.

21. The system of claim 20, wherein the advertisement is based on a network address of the user.

22. The system of claim 20, wherein the advertisement is based on a customer profile.

23. The system of claim 18, wherein the service feature includes at least one from the group of an autodialing feature, a personal calendar, a message waiting indicator, a caller identification indicator, a phone book, emergency numbers, a keypad and a call waiting indicator.

24. The system of claim 15, wherein the screen phone presents an interface from a plurality of selected theme-based, user-selectable, multimedia, interactive interfaces in a random or a round-robin fashion.

25. The system of claim 15, wherein the interface request received by said interface platform is from the user.

26. The system of claim 15, wherein the interface request received by said interface platform is from a party other than the user.

27. The system of claim 15, wherein the interface includes at least one from the group of textual, graphic animation, audio and video media.

28. An apparatus for providing an interactive interface having selectable graphic elements that represent numbers on a telephone keypad, the interface being selectable by a user on a screen phone connected to a network, comprising:

(a) means for receiving an interface request; and (b) means for sending the interface to the screen phone through the network for presentation to the user.

* * * * *